Patented May 6, 1924.

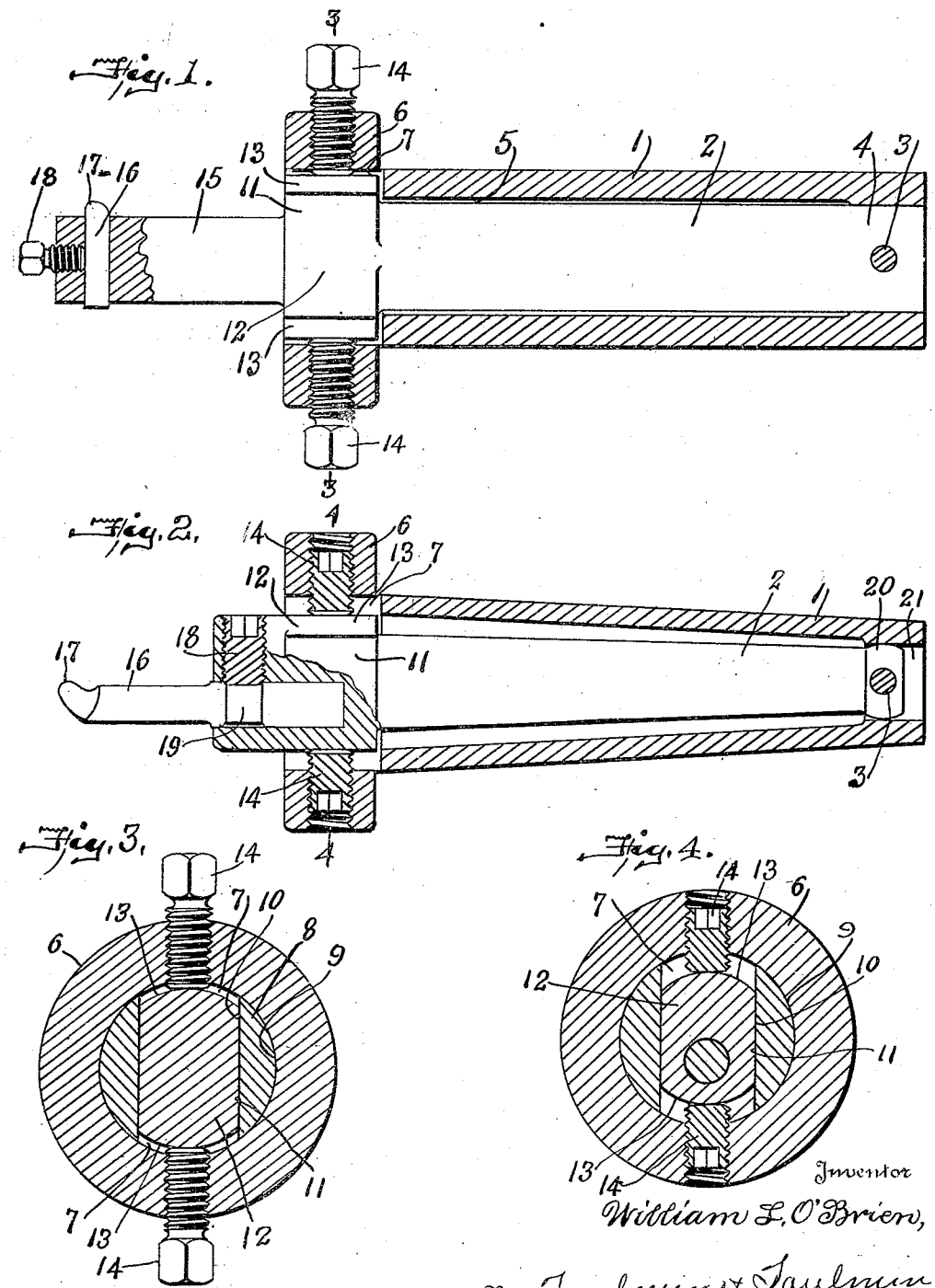

1,493,051

UNITED STATES PATENT OFFICE.

WILLIAM L. O'BRIEN, OF DAYTON, OHIO.

BORING TOOL.

Application filed September 15, 1922. Serial No. 588,422.

*To all whom it may concern:*

Be it known that I, WILLIAM L. O'BRIEN, a citizen of the United States, residing at Dayton, in the county of Montgomery and State of Ohio, have invented certain new and useful Improvements in Boring Tools, of which the following is a specification, reference being had therein to the accompanying drawing.

My invention relates to tools and in particular to cutting tools.

It is the object of my invention to provide a boring tool which will be readily adjustable in two directions and will permit of very delicate adjustments.

It is a further object of my invention to provide means for progressively adjusting the position of the cutting tool.

It is a further object of my invention to provide a contraction which will permit of this adjustment and which will also take up the torque of the cutting tool.

It is an additional object to provide an independent adjustment of the cutting tool permitting of different depths of cutting with the same tool by a simple adjustment which can be quickly made.

Referring to the drawings:—

Fig. 1 is a section of one form of a tool embodying my invention.

Fig. 2 is a section partially in full lines of another embodiment of my tool showing the means of supplementary adjustment of the cutting tool.

Fig. 3 is a section on the line 3—3 of Fig. 1.

Fig. 4 is a section on the line 4—4 of Fig. 2.

Referring to the drawings in detail:

One is a casing suitably held in a turret or the like on a machine tool in some predetermined rigid position. Because of the fact that a machine tool after some use becomes worn and the position of the casing 1 may vary from time to time therefore destroying a delicate boring operation, the present invention has been devised. The casing 1 supports a tool holder 2 which has a pin 3 passing through one end and also through the walls of 1. At the end 4 of 2 through which the pin 3 passes, the fit within the interior of 1 which is provided with a passageway 5 therein, is very close. There may be some clearance but this is not necessary because 2 will have sufficient flexing to permit of the adjustment of the tool in the housing 1.

A collar 6 is provided with a circular interior aperture 7. This collar may be an independent piece from 1 or a piece of the same material, but the former is preferred. If of an independent piece as shown, then it surrounds the projecting members 8 which are a part of 1. These members have semicircular exterior portions 9 and flat inner surfaces 10. These flat inner surfaces 10 engage with correspondingly flat surfaces 11 on the sides of the head 12 of 1. This is known as the adjusting head and the flat surfaces are known as the guiding surfaces of the adjusting head, while 2 is known as the supporting shaft. The adjusting head 12 has upper and lower rounded surfaces 13 which engage the retaining and adjusting screws 14.

These screws are carried in the ring 6.

The head 12 carries a shaft 15. This shaft supports the boring tool 16 which has a cutting edge 17. The shaft of the tool is engaged by a locking and setting screw 18. This permits of the adjustment vertically of the cutting tool and shaft and the increase or decrease of the depth of cut without the necessity of using another or larger and more expensive tool.

In the form shown in Fig. 2 a flat surface 19 is provided on the cutting tool eccentrically located so that as the tool is twisted the depth of cutting may be varied.

In this particular form of tool the attaching end of the shaft 2 has a rounded head 20 which fits within the restricted throat of 21 of 1, thus providing a ball surface for the movement of the shaft 2 and does not necessitate the flexing of 2 for the adjustment.

During the course of the work the supporting member 1 is held stationary and the cutting tool is located in the work which is rotated.

When it is desired to make the adjustment of the supporting tool member, one of the set screws is loosened and the other is tightened, thus allowing a very easy adjustment to be made which can be clearly seen and quickly accomplished. The cut may thus be progressively increased without disturbing the tool which is inside of the work. If desired the tool itself may be so adjusted that it will increase its depth of cutting and thus facilitate the operation without the substitution of a new tool.

Having described my invention as herein set forth I do not desire to confine myself to the details, but comprehend within it suitable modifications which may be found advisable in adapting my invention to varying conditions.

Having thus fully described my invention, what I claim as new and desire to secure by Letters Patent, is:

1. In combination, a supporting member, a supported member, and means for adjusting the supported member in the supporting member and a cutting tool carried by the supported member, said supporting member being provided with means for guiding in one plane the supported member when adjusted and to prevent it from turning about on its axis, and means for attaching the supported to the supporting member, so as to permit of slight movement for adjustment at one end of the supporting member, said means comprising a head on one end of the supporting member pivotally connected to the supporting member, said adjusting means being arranged at the opposite end of the supporting member.

2. In combination, a supporting member, a supported member, and means for adjusting the supported member in the supporting member and a cutting tool carried by the supported member, said supporting member being provided with means for guiding in one plane the supported member when adjusted and to prevent it from turning about on its axis, and means for attaching the supported to the supporting member, so as to permit of slight movement for adjustment at one end of the supporting member, and means of adjusting the tool to adjust the depth of cut without substitution of a new tool.

3. In a tool, a supporting casing, a tool holder attached thereto at one end adapted to move relatively thereto in the other, a supporting head on said tool holder having guiding faces thereon, said supporting member being provided with guiding jaws cooperating with said faces, a ring mounted on said jaws having set screws on either side thereof for engaging with the sides of the tool holder head to adjust its position relatively to the supporting member, and a cutting tool mounted in said head.

4. In a tool, a supporting casing, a tool holder attached thereto at one end adapted to move relatively thereto in the other, a supporting head on said tool holder having guiding faces thereon, said supporting member being provided with guiding jaws cooperating with said faces, a ring mounted on said jaws having set screws on either side thereof for engaging with the sides of the tool holder head to adjust its position relatively to the supporting member, and a cutting tool mounted in said head, and means for securing said cutting tool in adjusted position in the head.

5. In a tool, a supporting casing, a tool holder attached thereto at one end adapted to move relatively thereto in the other, a supporting head on said tool holder having guiding faces thereon, said supporting member being provided with guiding jaws cooperating with said faces, a ring mounted on said jaws having set screws on either side thereof for engaging with the sides of the tool holder head to adjust its position relatively to the supporting member, and a cutting tool mounted in said head, and means for securing said cutting tool in adjusted position in the head, said tool having a flat surface thereon for engagement with its adjusting means whereby by the rotation of the tool varying depth of cuts may be secured.

6. In a tool, a supporting casing, a tool holder located therein and attached to move relatively thereto save where attached at one end, and means for attaching said tool holder and casing to one another at one end, said casing being provided with guiding jaws having parallel flat guiding faces opposite one another and arcuate exterior faces, a tool supporting head on the tool holder having cooperating parallel faces located between said jaws, a ring mounted on said jaws, set screws oppositely disposed and adapted to be adjusted in said ring, and contacting with the free surfaces of the tool holder head, and a tool carried by said head.

7. In a tool, a supporting casing, a tool holder located therein and attached to move relatively thereto save where attached at one end, and means for attaching said tool holder and casing to one another at one end said casing being provided with guiding jaws having parallel flat, guiding faces opposite one another and arcuate exterior faces, a tool supporting head on the tool holder having cooperating parallel faces located between said jaws, a ring mounted on said jaws set screws oppositely disposed and adapted to be adjusted in said ring, and contacting with the free surfaces of the tool holder head, and a tool carried by said head, said tool being rotatable to vary the depth of cut thereby and means to maintain said tool in its adjusted position.

In testimony whereof, I affix my signature.

WILLIAM L. O'BRIEN.